United States Patent
Kim et al.

(10) Patent No.: US 9,624,403 B2
(45) Date of Patent: Apr. 18, 2017

(54) ADHESIVE FILM FOR POLARIZING PLATE, POLARIZING PLATE INCLUDING THE SAME AND OPTICAL DISPLAY INCLUDING THE SAME

(71) Applicant: Samsung SDI Co., Ltd., Yongin-si, Gyeonggi-do (KR)

(72) Inventors: Won Kim, Uiwang-si (KR); Yi Eun Kim, Uiwang-si (KR); Yoo Jin Suh, Uiwang-si (KR); Chul Jeong, Uiwang-si (KR); Ha Yun Cho, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/923,297

(22) Filed: Oct. 26, 2015

(65) Prior Publication Data
US 2016/0115355 A1    Apr. 28, 2016

(30) Foreign Application Priority Data

Oct. 24, 2014  (KR) .................. 10-2014-0145536
Oct. 21, 2015  (KR) .................. 10-2015-0146947

(51) Int. Cl.
| | |
|---|---|
| C09J 7/00 | (2006.01) |
| G02B 5/30 | (2006.01) |
| B32B 7/12 | (2006.01) |
| G02F 1/1335 | (2006.01) |
| B32B 27/08 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| C09J 133/08 | (2006.01) |
| C09J 133/14 | (2006.01) |

(52) U.S. Cl.
CPC ...... *C09J 7/00* (2013.01); *B32B 7/12* (2013.01); *B32B 27/08* (2013.01); *B32B 27/281* (2013.01); *B32B 27/285* (2013.01); *B32B 27/286* (2013.01); *B32B 27/304* (2013.01); *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *G02B 5/305* (2013.01); *G02F 1/133528* (2013.01); *B32B 2270/00* (2013.01); *B32B 2307/40* (2013.01); *B32B 2307/4026* (2013.01); *B32B 2405/00* (2013.01); *B32B 2457/20* (2013.01); *C09J 133/08* (2013.01); *C09J 133/14* (2013.01); *C09J 2201/606* (2013.01); *C09J 2201/622* (2013.01); *C09J 2203/318* (2013.01); *C09J 2433/00* (2013.01)

(58) Field of Classification Search
CPC ...... C09J 7/00; C09J 133/08; C09J 2201/606; C09J 2201/622; C09J 2203/318; B32B 7/00; B32B 7/12; G02B 5/305; G02F 1/00
See application file for complete search history.

(56) References Cited

U.S. PATENT DOCUMENTS

| | | | | |
|---|---|---|---|---|
| 2008/0278811 | A1* | 11/2008 | Perkins et al. ....... | G02B 5/3058 359/485.05 |
| 2010/0039590 | A1* | 2/2010 | Miyatake et al. ..... | C09J 129/04 349/96 |

FOREIGN PATENT DOCUMENTS

KR    10-2009-0112916 A    10/2009

* cited by examiner

*Primary Examiner* — Nathan M Nutter
(74) *Attorney, Agent, or Firm* — Lewis Roca Rothgerber Christie LLP (57) ABSTRACT

An adhesive film for polarizing plates has a K value of about 0.2 to about 0.5, as calculated by Equation 1. A polarizing plate includes the adhesive film for polarizing plates. An optical display includes the polarizing plate. The adhesive films for polarizing plates according to embodiments of the invention suppress light leakage due to dimensional changes in the polarizing plates at high temperature and/or high humidity.

$$K = \Delta G' \times \Delta R_0 \qquad \text{Equation 1}$$

15 Claims, 2 Drawing Sheets

ADHESIVE FILM FOR POLARIZING PLATE, POLARIZING PLATE INCLUDING THE SAME AND OPTICAL DISPLAY INCLUDING THE SAME

CROSS-REFERENCE TO RELATED APPLICATION

This application claims priority to and the benefit of Korean Patent Application No. 10-2014-0145536, filed on Oct. 24, 2014 and Korean Patent Application No. 10-2015-0146947, filed on Oct. 21, 2015 in the Korean Intellectual Property Office, the entire content of which is incorporated herein by reference.

BACKGROUND

1. Technical Field

Embodiments of the present invention relate to an adhesive film for polarizing plates, a polarizing plate including the same, and an optical display including the same.

2. Description of the Related Art

A liquid crystal display includes a panel for liquid crystal displays, which includes liquid crystals, and a polarizing plate bonded to the panel via an adhesive layer. The polarizing plate has a multilayer structure including a polarizer and a protective film formed on the polarizer.

Since the polarizer and the protective film are formed of materials having different molecular structures and compositions, the polarizer and the protective film have different physical properties. In addition, the polarizer is stretched to have a unidirectional molecular arrangement so as to exhibit polarization. Thus, the dimensions of the polarizing plate may change due to shrinkage or expansion of the polarizer at high temperature and/or high humidity. In particular, when the polarizing plate is secured to the panel via an adhesive, stress resulting from shrinkage or expansion of the polarizing plate is concentrated on the protective film at high temperature and/or high humidity, so that birefringence occurs on the protective film, thereby causing light leakage.

Light leakage may be suppressed by preventing residual stress from remaining in the protective film through adjustment of stress on the adhesive layer. However, since the protective film has residual stress at high temperature and/or high humidity, a crosslinked polymer in an adhesive film is aligned in a specific direction, causing birefringence. Generally, an acrylic adhesive exhibits negative birefringence.

Relieving stress by reducing the storage modulus of the adhesive film for polarizing plates may suppress light leakage. However, while this method is effective for 7 inch or smaller displays, the adhesive is very flexible and thus may not be durable, (e.g., exhibiting bubbling or detachment) long-term or resistant to stress caused by high temperature and high humidity, and may therefore suffer from deterioration in processability, such as leakage of the adhesive. Alternatively, changes in retardation of the protective film at high temperature and high humidity can be reduced through suppression of stress by increasing the storage modulus of the adhesive film for polarizing plates. However, while light leakage may be suppressed in a central portion of the display screen, severe light leakage may occur at an end portion or tip end of the screen due to increasing stress with increasing distance from the center to the end of the screen.

An acrylic adhesive composition which includes an acrylic copolymer and a liquid optically anisotropic compound has been proposed containing a mesogen core in a structure thereof, and thus may adjust the negative birefringence of an adhesive layer due to residual stress to a positive birefringence while securing stress relaxation.

When a stress-relieving adhesive having positive birefringence is used, light leakage may be effectively suppressed at an end portion of the screen (at which portion changes in retardation of a protective film are large) under high temperature/high humidity conditions. In this case, light leakage in the central portion of the screen (at which portions of the protective film suffers almost no change in retardation) is increased.

SUMMARY OF THE INVENTION

In accordance with embodiments of the present invention, an adhesive film for polarizing plates may have a K value of about 0.2 to about 0.5, as calculated by Equation 1.

$$K = \Delta G' \times \Delta R_0 \qquad \text{Equation 1}$$

In Equation 1, $\Delta G'$ is defined by Equation 2, and $\Delta R_0$ is defined by Equation 3.

$$\Delta G' = G1 - G2 \qquad \text{Equation 2}$$

In Equation 2, G1 is the storage modulus (unit: MPa) at 23° C., and G2 is the storage modulus (unit: MPa) at 85° C., as measured from a 500 μm thick stacked adhesive film for polarizing plates by temperature sweep testing under a strain of 5%, a normal force of 100 N and an angular frequency of 1 rad/sec while elevating temperature from 0° C. to 100° C. at a rate of 10° C./min using an advanced rheometry expansion system (ARES, TA Instrument Inc.).

$$\Delta R_0 = R_{01} - R_{02} \qquad \text{Equation 3}$$

In Equation 3, where $R_{01}$ is retardation (unit: nm) at 85° C. at a wavelength of 590 nm, and $R_{02}$ is retardation (unit: nm) at 23° C. at a wavelength of 590 nm, as measured from a 1 mm thick adhesive film for polarizing plates upon application of a stress of 125 mN/15 mm while elevating temperature from 0° C. to 100° C. at a rate of 10° C./min.

In embodiments, the adhesive film may have a G1 of about 0.45 MPa to about 1 MPa.

In embodiments, the adhesive film may have a G2 of about 0.01 MPa to about 0.3 MPa.

In embodiments, the adhesive film may be formed of an adhesive composition for polarizing plates including (A) a crosslinkable (meth)acrylic copolymer containing a crosslinkable functional group, (B) a non-crosslinkable (meth)acrylic copolymer having positive birefringence, and (C) a curing agent.

In embodiments, the (A) crosslinkable (meth)acrylic copolymer may be a copolymer of a monomer mixture including a crosslinkable functional group-containing monomer. In some embodiments, and in one embodiment, the crosslinkable functional group-containing monomer may be present in the monomer mixture in an amount of about 1% by weight (wt %) to about 20 wt % in the monomer mixture.

In embodiments, the (B) non-crosslinkable (meth)acrylic copolymer may be a copolymer of a monomer mixture including a crosslinkable functional group-containing monomer, and the crosslinkable functional group-containing monomer may be optionally present in the monomer mixture in an amount of less than about 1 wt %.

In embodiments, each of the (A) crosslinkable (meth)acrylic copolymer and the (B) non-crosslinkable (meth)acrylic copolymer may have a weight average molecular weight of less than about 1,000,000 g/mol.

In embodiments, the (B) non-crosslinkable (meth)acrylic copolymer may have a weight average molecular weight of about 300,000 g/mol to less than about 1,000,000 g/mol.

In embodiments, the (A) crosslinkable (meth)acrylic copolymer may be a copolymer of a monomer mixture including: at least one of a hydroxyl group-containing (meth)acrylic monomer and a carboxylic acid group-containing (meth)acrylic monomer; and an alkyl group-containing (meth)acrylic monomer.

In embodiments, the (B) non-crosslinkable (meth)acrylic copolymer may be a copolymer of a monomer mixture including an aromatic group-containing (meth)acrylic monomer, an alkyl group-containing (meth)acrylic monomer, and a (meth)acrylic monomer represented by Formula 2.

Formula 2

In Formula 2, A is a $C_1$ to $C_{20}$ aliphatic hydrocarbon group; B is —O— or —S—; $R_1$ is hydrogen or a methyl group; $R_2$ is a $C_1$ to $C_{20}$ aliphatic hydrocarbon group; and n is an integer of 1 to 5.

In embodiments, the (meth)acrylic monomer represented by Formula 2 may include 2-(2-ethoxyethoxy)ethyl (meth) acrylate.

In embodiments, the (A) crosslinkable (meth)acrylic copolymer may be present in an amount of about 60 parts by weight to about 95 parts by weight, based on 100 parts by weight of the (A) crosslinkable meth(acrylic) copolymer and the (b) non-crosslinkable meth(acrylic) copolymer, and the (B) non-crosslinkable (meth)acrylic copolymer may be present in an amount of about 5 parts by weight to about 40 parts by weight based on 100 parts by weight of the (A) crosslinkable (meth)acrylic copolymer and the (B) non-crosslinkable (meth)acrylic copolymer.

In embodiments, the adhesive composition for polarizing plates may further include a silane coupling agent.

In some embodiments of the present invention, a polarizing plate may include the adhesive film for polarizing plates as set forth above.

In some embodiments of the present invention, an optical display may include the polarizing plate as set forth above.

DETAILED DESCRIPTION OF THE INVENTION

Exemplary embodiments of the present invention are described with reference to the accompanying drawings. It should be understood that the present invention is not limited to the following embodiments and may be embodied in different ways, and that the embodiments are described to provide a thorough understanding of the invention by those skilled in the art. In the drawings, portions irrelevant to the description are omitted for clarity. Like components are denoted by like reference numerals throughout the specification.

As used herein, the term "(meth)acryl" may refer to acryl and/or methacryl, and the term "(meth)acrylate" may refer to acrylates and/or methacrylates. As used herein, directional terms such as "upper" and "lower" are defined with reference to the accompanying drawings. Thus, it is understood that the term "upper surface" may be used interchangeably with the term "lower surface".

Hereinafter, an adhesive film for polarizing plates according to embodiments of the present invention is described.

The adhesive film for polarizing plates according to embodiments of the present invention, may suppress light leakage due to dimensional changes in the polarizing plate at high temperature and/or high humidity. The adhesive film for polarizing plates may suppress light leakage through stress suppression and optical compensation. In addition, the adhesive film for polarizing plates may suppress light leakage in a central portion of the screen of a large-sized display and even at a distal end or tip end thereof as well.

When a polarizing plate includes a polarizer and a polarizer protective layer (i.e., an optical film, coating layer, or the like) formed on at least one surface of the polarizer, the adhesive film for polarizing plates may be used to secure the polarizing plate to a panel of an optical display or to another optical film. The adhesive film for polarizing plates may have a K value of about 0.2 to about 0.5, as calculated by Equation 1

$$K = \Delta G' \times \Delta R_0 \quad \text{Equation 1}$$

In Equation 1, $\Delta G'$ is defined by Equation 2, and $\Delta R_0$ is defined by Equation 3.

$$\Delta G' = G1 - G2 \quad \text{Equation 2}$$

In Equation 3, G1 is storage modulus (unit: MPa) at 23° C., and G2 is the storage modulus (unit: MPa) at 85° C., as measured from a 500 μm thick stacked adhesive film for polarizing plates by temperature sweep testing under a strain of 5%, a normal force of 100 N and an angular frequency of 1 rad/sec while elevating temperature from 0° C. to 100° C. at a rate of 10° C./min using an advanced rheometry expansion system (ARES, TA Instrument Inc.).

$$\Delta R_0 = R_{01} - R_{02} \quad \text{Equation 3}$$

In Equation 3, $R_{01}$ is retardation (unit: nm) at 85° C. at a wavelength of 590 nm, and $R_{02}$ is retardation (unit: nm) at 23° C. at a wavelength of 590 nm, as measured from a 1 mm thick adhesive film for polarizing plates upon application of a stress of 125 mN/15 mm while elevating temperature from 0° C. to 100° C. at a rate of 10° C./min.

The storage modulus and retardation ($R_0$) of the adhesive film for polarizing plates are measured using a 500 μm to 1 mm thick adhesive film specimen obtained by coating an adhesive composition for polarizing plates to a thickness of 50 μm onto a release film (for example, a polyethylene terephthalate film), aging at 20° C. to 100° C. for 1 minute to 7 days to form a 50 μm thick adhesive film, followed by stacking the adhesive films.

The K value is a measure for confirming that, when temperature is changed from 23° C. to a high temperature of 85° C., the adhesive film for polarizing plates has an effect of optical compensation (through molecular alignment of the adhesive film at an end thereof) as well as an effect of stress relaxation (due to high storage modulus thereof at high temperature) thereby suppressing light leakage not only in a central portion of the adhesive film for polarizing plates but also at a distal end or tip end thereof.

The adhesive film for polarizing plates may have a K value of about 0.2 to about 0.5. Within this range, the adhesive film for polarizing plates exhibits good light leakage suppression. As such, the adhesive film for polarizing plates has a K value of about 0.2 to about 0.5, thereby simultaneously suppressing stress and suppressing light leakage even at the end or tip end of the adhesive film (at which stress is larger than in the central portion of the adhesive film) through optical compensation by molecular alignment. In embodiments, the adhesive film for polarizing plates may have a K value of about 0.2 to about 0.45, for example, about 0.2, 0.25, 0.3, 0.35, 0.4, 0.45, or 0.5.

The adhesive film for polarizing plates may have a G1 value of about 0.45 MPa or greater, for example, about 0.45 MPa to about 1.0 MPa, as defined in Equations 1 and 2. Within this range, the adhesive film for polarizing plates may improve cuttability of the polarizing plate at room temperature. For example, the adhesive film for polarizing plates may have a G1 value of about 0.45 MPa, 0.46 MPa, 0.47 MPa, 0.48 MPa, 0.49 MPa, 0.50 MPa, 0.51 MPa, 0.52 MPa, 0.53 MPa, 0.54 MPa, 0.55 MPa, 0.56 MPa, 0.57 MPa, 0.58 MPa, 0.59 MPa, 0.6 MPa, 0.65 MPa, 0.7 MPa, 0.75 MPa, 0.8 MPa, 0.85 MPa, 0.9 MPa, 0.95 MPa, or 1.0 MPa.

In addition, the adhesive film for polarizing plates may have a G2 value of about 0.01 MPa to about 0.3 MPa, as defined in Equation 1. Within this range, the adhesive film for polarizing plates may suppress stress even at high temperature and thus suppress light leakage. For example, the adhesive film for polarizing plates may have G2 of about 0.01 MPa, 0.02 MPa, 0.03 MPa, 0.04 MPa, 0.05 MPa, 0.06 MPa, 0.07 MPa, 0.08 MPa, 0.09 MPa, 0.1 MPa, 0.15 MPa, 0.2 MPa, 0.25 MPa, or 0.3 MPa.

In embodiments, the adhesive film for polarizing plates may have $R_{01}$ and $R_{02}$ values of about 0 nm to about 10 nm, for example, about 0 nm, 0.01 nm, 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, or 10 nm.

In embodiments, since the adhesive film for polarizing plates has a high G2 value in addition to having a K value as set forth above, the adhesive film may suppress stress even at high temperature, and thus suppress light leakage.

The adhesive film for polarizing plates may be realized by an adhesive composition for polarizing plates according to embodiments of the present invention. Hereinafter, an adhesive composition for polarizing plates according to embodiments of the present invention is described.

The adhesive composition for polarizing plates may include (A) a crosslinkable (meth)acrylic copolymer containing a crosslinkable functional group, (B) a non-crosslinkable (meth)acrylic copolymer having positive birefringence, and (C) a curing agent.

The (A) crosslinkable (meth)acrylic copolymer containing a crosslinkable functional group may realize a crosslinked structure by section with the curing agent to increase the storage modulus of the adhesive film, thereby suppressing stress due to dimensional change of a polarizing plate at high temperature and/or high humidity to thereby suppress light leakage. The "crosslinkable functional group" may include at least one of a hydroxyl group and/or a carboxylic acid group, but is not limited thereto.

The (A) crosslinkable (meth)acrylic copolymer may be a copolymer of a first monomer mixture including a crosslinkable functional group-containing monomer. The crosslinkable functional group-containing monomer may be present in an amount of about 1 wt % to about 20 wt % in the first monomer mixture. Within this range, the adhesive film may exhibit an increased storage modulus, thus suppressing light leakage. In embodiments, the crosslinkable functional group-containing monomer may be present in an amount of about 3 wt % to about 10 wt %. For example, the crosslinkable functional group-containing monomer may be present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, or 20 wt %.

In embodiments, the crosslinkable functional group-containing monomer may include at least one of a hydroxyl group-containing (meth)acrylic monomer and/or a carboxylic acid group-containing (meth)acrylic monomer.

In embodiments, the hydroxyl group-containing (meth)acrylic monomer may be a $C_1$ to $C_{20}$ alkyl group, $C_5$ to $C_{20}$ cycloalkyl group, or $C_6$ to $C_{20}$ aryl group-containing (meth)acrylic acid ester having a hydroxyl group in a structure or end thereof. For example, the hydroxyl group-containing (meth)acrylic monomer may include at least one of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, 2-hydroxy-3-phenyloxypropyl (meth)acrylate, 4-hydroxycyclopentyl (meth)acrylate, 4-hydroxycyclohexyl (meth)acrylate, and/or cyclohexanedimethanol mono(meth)acrylate, but the hydroxyl group-containing meth(acrylic) monomer is not limited thereto. A single one of these monomers may be used, or a combination of monomers may be used.

In embodiments, the hydroxyl group-containing (meth)acrylic monomer may be optionally present in an amount of about 10 wt % or less in the (A) crosslinkable (meth)acrylic copolymer. Within this range, the adhesive film may suppress light leakage. For example, the hydroxyl group-containing (meth)acrylic monomer may be present in an amount of about 0.1 wt % to about 10 wt %, for example, about 0.1 wt % to about 5 wt %. In embodiments, the hydroxyl group-containing (meth)acrylic monomer may be present in an amount of about 0.1 wt % to about 2 wt %. For example, the hydroxyl group-containing (meth)acrylic monomer may not be present, or may be present in the (A) crosslinkable meth(acrylic) copolymer in an amount of about 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %.

The carboxylic acid group-containing (meth)acrylic monomer may include at least one of (meth)acrylic acid and β-carboxyethyl (meth)acrylate, but is not limited thereto. A single one of these monomers may be used, or a combination of monomers may be used.

In embodiments, the carboxylic acid group-containing (meth)acrylic monomer may be optionally present in an amount of about 10 wt % or less in the (A) crosslinkable (meth)acrylic copolymer. Within this range, the adhesive composition may suppress light leakage. For example, the carboxylic acid group-containing (meth)acrylic monomer may be present in an amount of about 0.1 wt % to about 10 wt %, for example, about 1 wt % to about 6 wt %. For example, the carboxylic acid group-containing (meth)acrylic monomer may not be present, or may be present in the (A) crosslinkable (meth)acrylic copolymer in an amount of about 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, or 10 wt %.

In embodiments, the hydroxyl group-containing (meth)acrylic monomer and the carboxylic acid group-containing (meth)acrylic monomer may be present in an amount of about 3 wt % to about 6 wt % in the (A) crosslinkable (meth)acrylic copolymer.

In embodiments, the monomer mixture for the (A) crosslinkable (meth)acrylic copolymer may further include an alkyl group-containing (meth)acrylic monomer. The alkyl group-containing (meth)acrylic monomer serves to improve the mechanical properties and reliability of the adhesive film, and may include a linear or branched $C_1$ to $C_{20}$ alkyl group-containing (meth)acrylic acid ester. For example, the alkyl group-containing (meth)acrylic monomer may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and/or dodecyl (meth)acrylate, but the alkyl group-containing (meth)acrylic monomer is not limited thereto. A single one of these monomers may be used or a combination of monomers may be used.

In embodiments, the alkyl group-containing (meth)acrylic monomer may be present in an amount of about 80 wt % to about 99 wt % in the first monomer mixture. Within this range, the adhesive film may exhibit good reliability. For example, the alkyl group-containing (meth)acrylic monomer may be present in an amount of about 90 wt % to about 97 wt %. For example, the alkyl group-containing (meth)acrylic monomer may be present in an amount of about 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, or 99 wt %.

The (A) crosslinkable (meth)acrylic copolymer may be a non-aromatic (meth)acrylic copolymer not containing an aromatic group. As described above, even when the (A) crosslinkable (meth)acrylic copolymer does not include an aromatic group, the adhesive film may suppress light leakage due to the presence of the (B) non-crosslinkable (meth)acrylic copolymer.

The (A) crosslinkable (meth)acrylic copolymer may have a weight average molecular weight of less than about 1,000,000 g/mol, but is not limited thereto. For example, the (A) crosslinkable (meth)acrylic copolymer may have a weight average molecular weight of about 300,000 g/mol to less than about 1,000,000 g/mol.

Although the (B) non-crosslinkable (meth)acrylic copolymer having positive birefringence is not crosslinked by the curing agent, the (B) non-crosslinkable (meth)acrylic copolymer forms an interpenetrating polymer network (IPN) structure in conjunction with the crosslinkable (meth)acrylic copolymer, thereby improving the storage modulus of the adhesive film. In addition, since the (B) non-crosslinkable (meth)acrylic copolymer is not crosslinked, molecules thereof may be more easily aligned than those of the (A) crosslinkable (meth)acrylic copolymer upon dimensional changes in the polarizing plate at high temperature and/or high humidity. Here, negative birefringence of the adhesive film and (meth)acrylic adhesive resin is canceled out by the positive birefringence due to alignment of an aromatic group, thereby suppressing light leakage through optical compensation.

In embodiments, the (B) non-crosslinkable (meth)acrylic copolymer may be a copolymer of a second monomer mixture including an aromatic group-containing (meth)acrylic monomer.

The aromatic group-containing (meth)acrylic monomer may be present in an amount of about 5 wt % to about 50 wt % in the second monomer mixture. Within this range, the adhesive film may have an effect of optical compensation through molecular alignment at high temperature, thereby suppressing light leakage. For example, the aromatic group-containing (meth)acrylic monomer may be present in an amount of about 5 wt % to about 35 wt %. For example, the aromatic group-containing (meth)acrylic monomer may be present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

The aromatic group-containing (meth)acrylic monomer may be represented by Formula 1.

Formula 1

In Formula 1, Y is hydrogen or a methyl group; p is an integer of 0 to 10; and X is selected from phenoxy, phenyl, methylphenyl, methylethylphenyl, methoxyphenyl, propylphenyl, cyclohexylphenyl, chlorophenyl, bromophenyl, phenylphenyl, benzyl, and benzylphenyl groups.

For example, the aromatic group-containing (meth)acrylic monomer may include at least one of phenoxyethyl (meth)acrylate, phenyl (meth)acrylate, phenoxy (meth)acrylate, 2-ethylphenoxy (meth)acrylate, benzyl (meth)acrylate, 2-phenylethyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl)ethyl (meth)acrylate, 2-(4-bromophenyl)ethyl (meth)acrylate, 2-(3-phenylphenyl)ethyl (meth)acrylate, benzyl (meth)acrylate, and/or 2-(4-benzylphenyl)ethyl (meth)acrylate, but the aromatic group-containing (meth)acrylic monomer is not limited thereto.

In embodiments, the second monomer mixture for the (B) non-crosslinkable (meth)acrylic copolymer may further include an alkyl group-containing (meth)acrylic monomer. The alkyl group-containing (meth)acrylic monomer may be included to improve the mechanical properties and reliability of the adhesive film. For example, the second monomer mixture may include a linear or branched $C_1$ to $C_{20}$ alkyl group-containing (meth)acrylic acid ester.

The alkyl group-containing (meth)acrylic monomer may be present in an amount of about 0.1 wt % to about 50 wt % in the second monomer mixture. Within this range, the adhesive film may improve reliability. For example, the alkyl group-containing (meth)acrylic monomer may be present in an amount of about 1 wt % to about 20 wt %. For example, the alkyl group-containing (meth)acrylic monomer may be present in an amount of about 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %.

In embodiments, the second monomer mixture for the (B) non-crosslinkable (meth)acrylic copolymer may further include a (meth)acrylic monomer represented by Formula 2.

Formula 2

In Formula 2, A is an aliphatic hydrocarbon group; B is —O— or —S—; $R_1$ is hydrogen or a methyl group; $R_2$ is a $C_1$ to $C_{20}$ aliphatic hydrocarbon group; and n is an integer of 1 to 5.

In embodiments, A may be a $C_1$ to $C_{10}$ aliphatic hydrocarbon group, for example, a linear or branched $C_1$ to $C_{10}$ alkylene group, or a linear or branched $C_1$ to $C_5$ alkylene group. $R_2$ may be a $C_1$ to $C_{10}$ aliphatic hydrocarbon group, for example, a linear or branched $C_1$ to $C_{10}$ alkyl group, or a linear or branched $C_1$ to $C_5$ alkyl group. For example, the (meth)acrylic monomer represented by Formula 2 may be 2-(2-ethoxyethoxy)ethyl (meth)acrylate, but is not without being limited thereto.

The monomer represented by Formula 2 may be synthesized by any suitable method, or may be obtained commercially. The monomer represented by Formula 2 is included in the (B) non-crosslinkable (meth)acrylic copolymer to improve the optical properties and light leakage of the adhesive film, and may also improve adhesion. The monomer represented by Formula 2 may be present in an amount of about 10 wt % to about 85 wt % in the second monomer mixture. Within this range, the adhesive film may suppress light leakage. In embodiments, the monomer represented by Formula 2 may be present in an amount of about 55 wt % to about 80 wt %. For example, the monomer represented by Formula 2 may be present in an amount of about 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, or 85 wt %.

As a result, the adhesive film for polarizing plates may include a functional group represented by Formula 3.

Formula 3

In Formula 3, * represents a binding site, and A, B, $R_2$ and n are, as defined above in connection with Formula 2.

In embodiments, the (B) non-crosslinkable (meth)acrylic copolymer may be a copolymer of a monomer mixture including a crosslinkable functional group-containing monomer. In embodiments, the crosslinkable functional group-containing monomer may include at least one of the hydroxyl group-containing (meth)acrylic monomer and the carboxylic acid group-containing (meth)acrylic monomer, which are discussed above. In embodiments, the crosslinkable functional group-containing monomer may be optionally present in an amount of less than about 1 wt % in the monomer mixture. For example, the crosslinkable functional group-containing monomer may not be present, or may be present in an amount of 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, or less than about 1 wt %.

The (B) non-crosslinkable (meth)acrylic copolymer may have a weight average molecular weight of less than about 1,000,000 g/mol. Within this range, the adhesive film may suppress light leakage. For example, the (B) non-crosslinkable (meth)acrylic copolymer may have a weight average molecular weight of about 300,000 g/mol to less than about 1,000,000 g/mol.

The (A) crosslinkable (meth)acrylic copolymer may be present in an amount of about 60 parts by weight to about 95 parts by weight, and the (B) non-crosslinkable (meth)acrylic copolymer may be present in an amount of about 5 parts by weight to about 40 parts by weight, each based on 100 parts by weight of the (A) crosslinkable (meth)acrylic copolymer and the (B) non-crosslinkable (meth)acrylic copolymer. Within these ranges, the adhesive film may suppress light leakage due to stress suppression and optical compensation. For example, the (A) crosslinkable (meth)acrylic copolymer may be present in an amount of about 70 parts by weight to about 90 parts by weight, and the (B) non-crosslinkable (meth)acrylic copolymer may be present in an amount of about 10 parts by weight to about 30 parts by weight.

For example, the (A) crosslinkable (meth)acrylic copolymer may be present in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 parts by weight. In addition, the (B) non-crosslinkable (meth)acrylic copolymer may be present in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight.

The monomer mixture for each of the (A) crosslinkable (meth)acrylic copolymer and the (B) non-crosslinkable (meth)acrylic copolymer may further include at least one of an alicyclic group-containing (meth)acrylic monomer and/or a hetero ring-containing (meth)acrylic monomer.

The alicyclic group-containing (meth)acrylic monomer is a $C_3$ to $C_{10}$ alicyclic group-containing (meth)acrylic acid ester, and may include, for example, isobornyl (meth)acrylate, cyclohexyl (meth)acrylate, and/or the like. The alicyclic group-containing (meth)acrylic monomer may be present in an amount of about 10 wt % or less in each of the (A)

crosslinkable (meth)acrylic copolymer and the (B) non-crosslinkable (meth)acrylic copolymer. Within these ranges, the adhesive film may exhibit improved durability and good reworkability. For example, the alicyclic group-containing (meth)acrylic monomer may be optionally present in an amount of about 5 wt % or less. For example, the alicyclic group-containing (meth)acrylic monomer may not be present, or may be present in an amount of about 0.1 wt %, about 0.2 wt %, about 0.3 wt %, about 0.4 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %.

The hetero ring-containing (meth)acrylic monomer may be a monomer having a heteroatom (for example, at least one of nitrogen, oxygen, and/or sulfur)-containing $C_2$ to $C_{10}$ aliphatic or alicyclic saturated or unsaturated hetero ring, or $C_4$ to $C_{20}$ aromatic hetero ring. For example, the hetero ring-containing (meth)acrylic monomer may include acryloylmorpholine. The hetero ring-containing (meth)acrylic monomer may be present in an amount of about 10 wt % or less in each of the (A) crosslinkable (meth)acrylic copolymer and the (B) non-crosslinkable (meth)acrylic copolymer. Within these ranges, the adhesive film may exhibit improved durability and good reworkability. For example, the hetero ring-containing (meth)acrylic monomer may be optionally present in an amount of about 5 wt % or less. For example, the alicyclic group-containing (meth)acrylic monomer may not be present, or may be present in an amount of about 0.1 wt %, about 0.2 wt %, about 0.3 wt %, about 0.4 wt %, about 0.5 wt %, about 1 wt %, about 2 wt %, about 3 wt %, about 4 wt %, about 5 wt %, about 6 wt %, about 7 wt %, about 8 wt %, about 9 wt %, or about 10 wt %.

The (meth)acrylic copolymers may be prepared using solution polymerization, photopolymerization, bulk polymerization or emulsion polymerization, but are not limited thereto. In embodiments, the (meth)acrylic copolymers are prepared through solution polymerization at a temperature of about 50° C. to about 140° C. for about 5 hours to about 24 hours. An initiator used in the polymerization may be any suitable initiator including: azo polymerization initiators such as azobisisobutyronitrile and azobiscyclohexanecarbonitrile; peroxides such as benzoyl peroxide and acetyl peroxide; and the like. The initiator may be present in an amount of about 0.1 parts by weight to about 10 parts by weight based on 100 parts by weight of the alkyl group-containing (meth)acrylic monomer. Within this range, the copolymer may be sufficiently polymerized. The solvent used in the polymerization may include at least one of ethyl acetate and methylethylketone, but is not limited thereto. For example, the solvent may be present in an amount of about 0.01, 0.05, 0.1, 0.2, 0.3, 0.4, 0.5, 1, 2, 3, 4, 5, 6, 7, 8, 9, or 10 parts by weight.

The (meth)acrylic copolymers may be present in an amount of about 90 wt % to about 99 wt % in the adhesive composition for polarizing plates in terms of solids content. Within this range, the adhesive composition has an advantage in film formation, and distribution of the components of the adhesive composition is uniform when the components are mixed. For example, the (meth)acrylic copolymers may be present in an amount of about 90 wt %, 91 wt %, 92 wt %, 93 wt %, 94 wt %, 95 wt %, 96 wt %, 97 wt %, 98 wt %, or 99 wt %.

The curing agent cures the (meth)acrylic copolymers and may include at least one of isocyanate, epoxy, aziridine, melamine, amine, imide, carbodiimide, and/or amide curing agents. For example, the curing agent may include a polyfunctional curing agent in order to improve stress suppression by increasing the storage modulus of the adhesive film through crosslinking thereof with the crosslinkable (meth)acrylic copolymer.

The isocyanate curing agent may include: hexamethylene diisocyanate (HDI); toluene diisocyanate (TDI) including 2,4-toluene diisocyanate, 2,6-toluene diisocyanate; 4,4'-methylene diphenyl diisocyanate (MDI); xylene diisocyanate (XDI) including 1,3-xylene diisocyanate, 1,4-xylene diisocyanate; hydrogenated tolylene diisocyanate; isophorone diisocyanate; 1,3-bisisocyanatomethylcyclohexane, tetramethylxylene diisocyanate; 1,5-naphthalene diisocyanate; hexamethylene diisocyanate; 2,2,4-trimethylhexamethylene diisocyanate; 2,4,4-trimethylhexamethylene diisocyanate; trimethylolpropane-modified toluene diisocyanate; trimethylolpropane-modified tolylene diisocyanate; tolylene diisocyanate adducts of trimethylolpropane, xylene diisocyanate adducts of trimethylolpropane, triphenylmethane triisocyanate; and/or methylenebis(triisocyanate), but the isocyanate curing agent is not limited thereto. A single one of these curing agents may be used, or a combination of curing agents may be used.

The curing agent may be present in an amount of about 0.1 parts by weight to about 10 parts by weight based on 100 parts by weight of the sum of the (A) crosslinkable (meth)acrylic copolymer and the (B) non-crosslinkable (meth)acrylic copolymer. Within this range, the adhesive composition may exhibit durability and a reduced number of changes in the components and properties over time. In embodiments, the curing agent may be present in an amount of about 5 parts by weight to about 8 parts by weight. For example, the curing agent may be present in an amount of about 0.1, 0.2, 0.3, 0.4, 0.5, 0.6, 0.7, 0.8, 0.9, 1, 2, 3, 4, 5, 6, 7, 8, 9, or 10 parts by weight.

The curing agent may be present in an amount of about 1 wt % to about 10 wt % in the adhesive composition for polarizing plates in terms of solids content. Within this range, the adhesive composition may exhibit durability and a reduced number of changes in the components and properties over time. For example, the curing agent may be present in an amount of about 0.1 wt % to about 9 wt %, for example, about 5 wt % to about 8 wt %. For example, the curing agent may be present in an amount of about 1 wt %, 2 wt %, 3 wt %, 4 wt %, 5 wt %, 6 wt %, 7 wt %, 8 wt %, 9 wt %, or 10 wt %.

The adhesive composition for polarizing plates may further include a silane coupling agent. The silane coupling agent may be included in the adhesive composition to improve moisture resistance and moist heat resistance of the adhesive film for polarizing plates.

The silane coupling agent may be any suitable silane coupling agent known to those skilled in the art. For example, the silane coupling agent may include: epoxy structure-containing silicon compounds such as 3-glycidoxypropyltrimethoxysilane, 3-glycidoxypropylmethyldimethoxysilane, 2-(3,4-epoxycyclohexyl)ethyltrimethoxysilane; polymerizable unsaturated group-containing silicon compounds such as vinyltrimethoxysilane, vinyltriethoxysilane, (meth)acryloxypropyltrimethoxysilane; amino group-containing silicon compounds such as 3-aminopropyltrimethoxysilane, N-(2-aminoethyl)-3-aminopropyltrimethoxysilane, N-(2-aminoethyl)-3-aminopropylmethyldimethoxysilane, and/or 3-chloropropyltrimethoxysilane, but the silane coupling agent is not limited thereto. A single one of these silane coupling agents may be used, or a combination thereof. In embodiments, the silane coupling agent is an epoxy structure-containing silane coupling agent.

The silane coupling agent may be present in an amount of about 0.1 parts by weight to about 5 parts by weight based on 100 parts by weight of the (A) crosslinkable (meth) acrylic copolymer and the (B) non-crosslinkable (meth) acrylic copolymer. Within this range, the adhesive composition may exhibit durability and a reduced number of changes in the components and properties over time. In embodiments, the silane coupling agent may be present in an amount of about 0.1 parts by weight to about 0.5 parts by weight. For example, the silane coupling agent may be present in an amount of about 0.1, 0.2, 0.3, 0.4, 0.5, 0.6, 0.7, 0.8, 0.9, 1, 2, 3, 4, or 5 parts by weight.

The silane coupling agent may be present in an amount of about 0.1 wt % to about 9 wt % in the adhesive composition for polarizing plates in terms of solids content. Within this range, the adhesive composition may exhibit excellent good adhesion to a liquid crystal panel, and the (meth)acrylic copolymers may exhibit good storage stability. For example, the silane coupling agent may be present in an amount of about 0.1 wt % to about 1 wt %. For example, the silane coupling agent may be present in an amount of about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 2 wt %, about 3 wt %, about 4 wt %, about 5 wt %, about 6 wt %, about 7 wt %, about 8 wt %, or about 9 wt %.

The adhesive composition for polarizing plates may further include a solvent. The solvent may include methylethylketone and/or the like, but is not limited thereto. The adhesive composition for polarizing plates may further include any suitable additive, such as UV absorbers, antioxidants, and/or the like.

The adhesive composition for polarizing plates may have a viscosity of about 1,000 cPs to about 6,000 cPs at 25° C. Within this range, the adhesive composition allows easy thickness adjustment of the adhesive film, and the adhesive film does not have (or has a reduced amount of) stains, and a uniform coating surface may be obtained.

The adhesive film for polarizing plates according to embodiments of the present invention may be manufactured by drying and/or aging the adhesive composition for polarizing plates as set forth above. For Example, aging of the adhesive composition may be performed by thermally curing the adhesive composition or by leaving the adhesive composition alone at about 20° C. to about 35° C. for about 1 hour to about 1 week, but the curing mechanism is not limited thereto. For example, the adhesive film for polarizing plates may be coated onto a release film (for example, a polyethylene terephthalate film), followed by drying, and then cured at about 20° C. to about 35° C., thereby manufacturing the adhesive film.

The adhesive film for polarizing plates may have a thickness of about 5 μm to about 200 μm. Within this thickness range, the adhesive film may be used as an adhesive film for polarizing plates.

According to embodiments of the invention, a polarizing plate includes the adhesive film for polarizing plates as set forth above, or an adhesive layer formed of the adhesive composition for polarizing plates as set forth above. Hereinafter, a polarizing plate according to embodiments is described with reference to FIG. 1.

Figure 1:
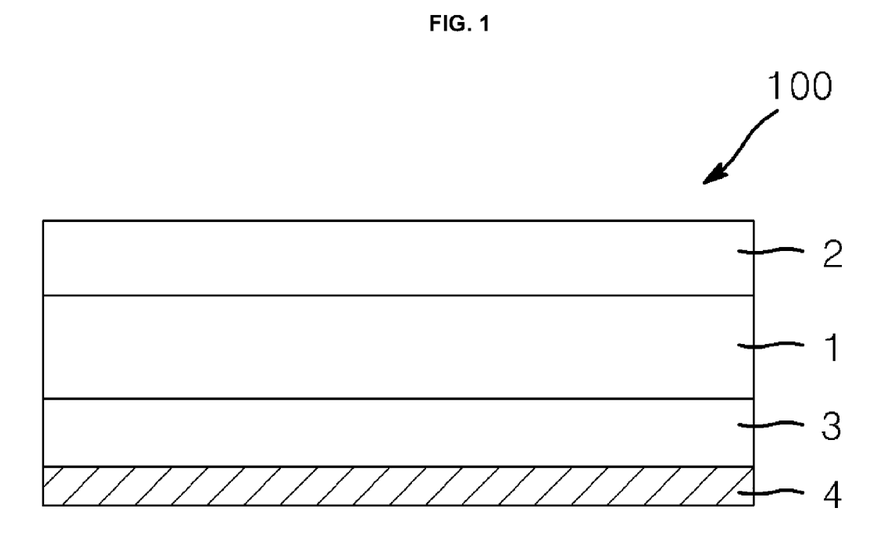
FIG. 1 is a schematic cross-sectional view of a polarizing plate according to embodiments of the present invention.

Referring to FIG. 1, a polarizing plate 100 according to embodiments of the invention may include: a polarizer 1; a first protective film 2 formed on an upper surface of the polarizer 1; a second protective film 3 formed on a lower surface of the polarizer 1; and a first adhesive film 4 formed on a lower surface of the second protective film 3. The first adhesive film 4 may be formed of the adhesive film for polarizing plates, or the adhesive composition for polarizing plates according to embodiments of the invention.

The polarizer may include any polyvinyl alcohol film, regardless of the method of manufacturing the polyvinyl alcohol films. For example, the polarizer may include modified polyvinyl alcohol films, such as partially formalized polyvinyl alcohol films, acetoacetyl group-modified polyvinyl alcohol films, and/or the like. In embodiments, the polarizer is manufactured by dyeing a polyvinyl alcohol film with iodine or a dichroic dye, followed by stretching the polyvinyl alcohol film in a certain direction. For example, the polarizer is manufactured through swelling, dyeing, and stretching. Methods of performing these processes are generally known to those skilled in the art. For example, the polarizer may have a thickness of about 10 μm to about 50 μm, but is not limited thereto. Within this range, the polarizer may be used for optical displays.

Each of the first and second protective films may be stacked on one surface of the polarizer. The first and second protective films may be the same or different. The first and second protective films may include cyclic olefin polymers (COP) including amorphous cyclic olefin polymers, poly (meth)acrylate, polycarbonate, polyester including polyethylene terephthalate (PET), polyethersulfone, polysulfone, polyamide, polyimide, polyolefin, polyarylate, polyvinyl alcohol, polyvinyl chloride, polyvinylidene chloride films, and mixtures thereof. The protective films may have a thickness of about 10 μm to about 200 μm, for example, about 30 μm to about 120 μm, but are not limited thereto. Within these ranges, the protective films may be used for optical displays.

The adhesive film may be formed by coating the adhesive composition according to embodiments onto one surface of the protective film, followed by drying and/or curing. The adhesive film may have a thickness of about 5 μm to about 100 μm.

The adhesive film 4 is stacked on one surface of a liquid crystal display panel (not shown in FIG. 1) to secure the polarizing plate to the liquid crystal display panel.

In addition, although not shown in FIG. 1, bonding layers may be formed between the polarizer 1 and the first protective film 2 and between the polarizer 1 and the second protective film 3, and the bonding layers may be formed of any suitable bonding agent for polarizing plates. Specifically, the bonding agent for polarizing plates may include a water-based bonding agent including a polyvinyl alcohol resin, or a photocurable bonding agent including a (meth) acrylic bonding resin.

Figure 2:
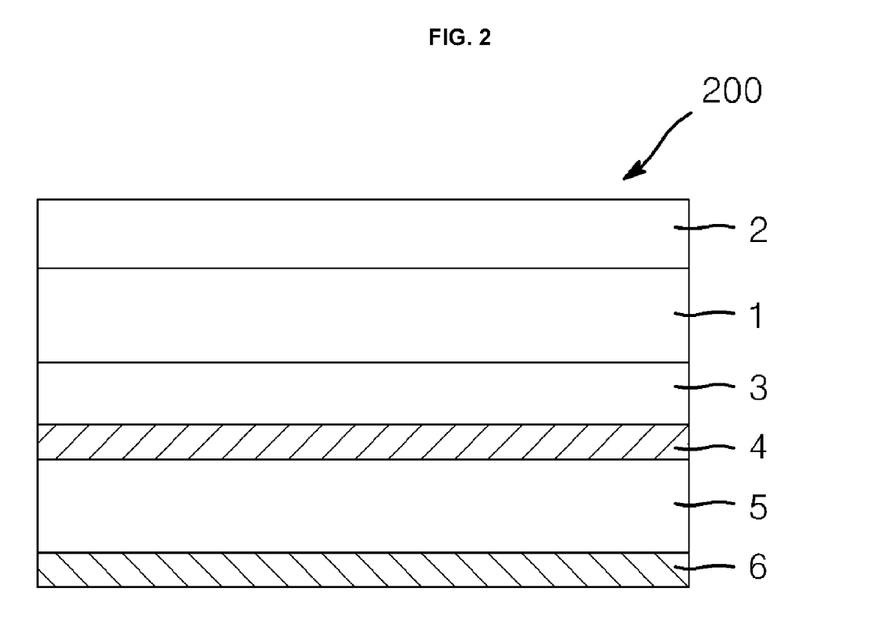
FIG. 2 is a schematic cross-sectional view of a polarizing plate according to embodiments of the present invention.

Hereinafter, a polarizing plate according to embodiments of the present invention is described with reference to FIG. 2. FIG. 2 is a schematic cross-sectional view of a polarizing plate according to another embodiment of the present invention.

Referring to FIG. 2, a polarizing plate 200 according to embodiments may include: a polarizer 1; a first protective film 2 formed on an upper surface of the polarizer 1; a second protective film 3 formed on a lower surface of the polarizer 1; a first adhesive film 4 formed on a lower surface of the second protective film 3; a third protective film 5 formed on a lower surface of the first adhesive film 4; and a second adhesive film 6 stacked on a lower surface of the third protective film 5. At least one of the first adhesive film 4 and the second adhesive film 6 may be formed of the adhesive composition for polarizing plates according to embodiments of the present invention. The polarizing plate 200 is substantially the same as the polarizing plate 100 described above in connection with FIG. 1, except that the polarizing plate 200 further includes the third protective film and the second adhesive film formed on the lower surface of the first adhesive film.

The third protective film may include a cyclic olefin polymer (COP) including amorphous cyclic olefin polymers, poly(meth)acrylate, polycarbonate, polyesters including polyethylene terephthalate (PET), polyethersulfone, polysulfone, polyamide, polyimide, polyolefin, polyarylate, polyvinyl alcohol, polyvinyl chloride, polyvinylidene chloride films, and mixtures thereof. The protective films may have a thickness of about 10 μm to about 200 μm, for example, about 30 μm to about 120 μm, but are not limited thereto. Within these ranges, the protective films may be used for optical displays.

The second adhesive film 6 is stacked on one surface of a liquid crystal display panel (not shown in FIG. 2) to secure the polarizing plate to the liquid crystal display panel.

According to embodiments of the present invention, a display may include the adhesive film as set forth above or the polarizing plate as set forth above. The display may include liquid crystal displays including TFT-LCDs, but is not limited thereto.

Figure 3:
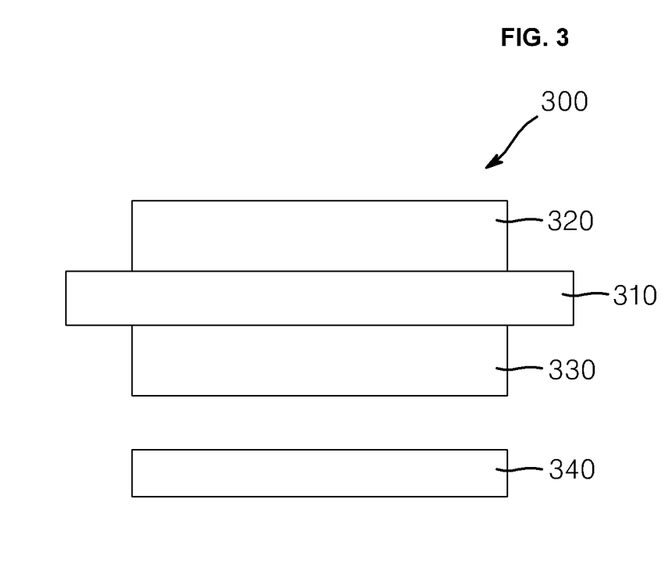
FIG. 3 is a schematic cross-sectional view of an optical display according to embodiments of the present invention.

Hereinafter, an optical display according to embodiments of the present invention is described with reference to FIG. 3. FIG. 3 is a schematic cross-sectional view of an optical display according to embodiments of the present invention.

Referring to FIG. 3, an optical display 300 according to embodiments may include a liquid crystal display panel 310, a first polarizing plate 320 formed on an upper surface of the liquid crystal display panel 310, and a second polarizing plate 330 formed on a lower surface of the liquid crystal display panel 310 and disposed between the liquid crystal display panel 310 and a light source unit 340. At least one of the first polarizing plate 320 and the second polarizing plate 330 may be the polarizing plate according to embodiments of the present invention.

In embodiments, the optical display may be a large display including a 7 inch or larger liquid crystal display panel.

Hereinafter, embodiments of the present invention are described in with reference to some examples. It is understood that these examples are provided for illustration only and are not to be construed in any way as limiting the present invention.

Preparative Example 1

Preparation of (Meth)Acrylic Copolymer 50 g of ethyl acetate, 10 g of methylethylketone, 95 g of butyl acrylate, 4 g of acrylic acid, and 1 g of 2-hydroxyethyl methacrylate were placed in a 1 L 4-neck flask, which in turn was heated to 70° C. and then maintained at 70° C. 0.06 g of azobisisobutyronitrile (as an initiator) was dissolved in 20 g of ethyl acetate and then introduced into the flask. After reaction at 65° C. for 3 hours, 170 g of methylethylketone was added to the resulting material, followed by cooling to 40° C., thereby preparing an acrylic copolymer (Mw: 900,000 g/mol) having a viscosity at 25° C. of 4,400 cPs.

Preparative Example 2

Preparation of (Meth)Acrylic Copolymer 50 g of ethyl acetate, 10 g of methylethylketone, 60 g of 2-(2-ethoxyethoxy)ethyl acrylate, 10 g of butyl acrylate, and 30 g of 2-phenoxyethyl acrylate were placed in a 1 L 4-neck flask, which in turn was heated to 70° C. and then maintained at 70° C. 0.06 g of azobisisobutyronitrile (as an initiator) was dissolved in 20 g of ethyl acetate and then introduced into the flask. After reaction at 65° C. for 3 hours, 170 g of methylethylketone was added to the resulting material, followed by cooling to 40° C., thereby preparing an acrylic copolymer (Mw: 600,000 g/mol) having a viscosity at 25° C. of 4,400 cPs.

Preparative Example 3

Preparation of (Meth)Acrylic Copolymer 50 g of ethyl acetate, 10 g of methylethylketone, 80 g of 2-(2-ethoxyethoxy)ethyl acrylate, 8 g of butyl acrylate, 7 g of 2-phenoxyethyl acrylate, 4 g of acrylic acid, and 1 g of 2-hydroxyethyl methacrylate were placed in a 1 L 4-neck flask, which in turn was heated to 70° C. and then maintained at 70° C. 0.06 g of azobisisobutyronitrile (as an initiator) was dissolved in 20 g of ethyl acetate and then introduced into the flask. After reaction at 65° C. for 3 hours, 170 g of methylethylketone was added to the resulting material, followed by cooling to 40° C., thereby preparing an acrylic copolymer (Mw: 900,000 g/mol) having a viscosity at 25° C. of 4,400 cPs.

Preparative Example 4

Preparation of (Meth)Acrylic Copolymer 50 g of ethyl acetate, 10 g of methylethylketone, 60 g of 2-(2-ethoxyethoxy)ethyl acrylate, and 40 g of butyl acrylate were placed in a 1 L 4-neck flask, which in turn was heated to 70° C. and then maintained at 70° C. 0.06 g of azobisisobutyronitrile (as an initiator) was dissolved in 20 g of ethyl acetate and then introduced into the flask. After reaction at 65° C. for 3 hours, 170 g of methylethylketone was added to the resulting material, followed by cooling to 40° C., thereby preparing an acrylic copolymer (Mw: 900,000 g/mol) having a viscosity at 25° C. of 4,400 cPs.

Preparative Example 5

Preparation of (Meth)Acrylic Copolymer 50 g of ethyl acetate, 10 g of methylethylketone, 65 g of butyl acrylate, 30 g of 2-phenoxyethyl acrylate, 4 g of acrylic acid, and 1 g of 2-hydroxyethyl methacrylate were placed in a 1 L 4-neck flask, which in turn was heated to 70° C. and then maintained at 70° C. 0.06 g of azobisisobutyronitrile (as an initiator) was dissolved in 20 g of ethyl acetate and then introduced into the flask. After reaction at 65° C. for 3 hours, 170 g of methylethylketone was added to the resulting material, followed by cooling to 40° C., thereby preparing an acrylic copolymer (Mw: 250,000 g/mol) having a viscosity at 25° C. of 1,200 cPs.

Example 1

The copolymer of Preparative Example 1 and the copolymer of Preparative Example 2 were mixed in amounts as listed in Table 1 (unit: parts by weight), added to 18 parts by weight of methylethylketone, followed by stirring at 25° C. for 30 minutes. Next, 7.1 parts by weight of an isocyanate curing agent (trimethylolpropane-modified tolylene diisocyanate, model: Colonate-L, Nippon Polyurethane Co., Ltd.)

and 0.5 parts by weight of a silane coupling agent (3-glycidoxypropyltrimethoxysilane, model: KBM-403, Shin-Etsu Chemical Co., Ltd.) were further added to the resulting material, followed by mixing the components, thereby preparing an adhesive composition for polarizing plates. The prepared adhesive composition was coated onto a release film (for example, a silicone-coated polyethylene terephthalate film), followed by drying at 100° C. for 3 minutes, thereby forming a 20 μm thick adhesive film for polarizing plates. The adhesive film for polarizing plates was stacked on a polarizing plate, followed by aging under constant temperature and humidity conditions (35° C., 45% RH).

Examples 2 to 5 and Comparative Examples 1 to 6

An adhesive composition for polarizing plates and an adhesive film for polarizing plates were manufactured in the same manner as in Example 1 except that the amount of each of the components in Example 1 was modified as listed in Table 1.

for 3 minutes, thereby forming a 50 μm thick adhesive film for polarizing plates. The adhesive film was stacked to a thickness of 500 μm and cut into a circular specimen having a diameter of 8 mm. The storage modulus at 23° C. (G1) and storage modulus at 85° C. (G2) were measured by temperature sweep testing under strain of 5%, a normal force of 100 N and an angular frequency of 1 rad/sec while elevating temperature from 0° C. to 100° C. at a rate of 10° C./min using an advanced rheometry expansion system (ARES, TA Instrument Inc.). Next, the change in storage modulus (ΔG') was calculated by Equation 2.

$$\Delta G' = G1 - G2 \qquad \text{Equation 2}$$

(2) Retardation

Each of the adhesive compositions for polarizing plates prepared in Examples 1 to 5 and Comparative Examples 1 to 6 was coated onto a release film (for example, a polyethylene terephthalate film), followed by drying at 100° C. for 3 minutes, thereby forming a 50 μm thick adhesive film for polarizing plates. The adhesive film was stacked to a

TABLE 1

| Unit (parts by weight) | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Preparative Example 1 | 90 | 80 | 70 | — | 90 | 80 | 100 | — | 50 | — | — |
| Preparative Example 2 | 10 | 20 | 30 | 10 | 10 | — | — | — | 50 | 100 | — |
| Preparative Example 3 | — | — | — | 90 | — | — | — | 100 | — | — | — |
| Preparative Example 4 | — | — | — | — | — | 20 | — | — | — | — | — |
| Preparative Example 5 | — | — | — | — | — | — | — | — | — | — | 100 |
| Curing agent | 7.1 | 7.1 | 7.1 | 7.1 | 7.1 | 7.1 | 7.1 | 7.1 | 7.1 | 7.1 | 7.1 |
| Silane coupling agent | 0.5 | 0.5 | 0.5 | 0.5 | — | 0.5 | 0.5 | 0.5 | 0.5 | 0.5 | 0.5 |

The adhesive compositions for polarizing plates of the Examples and Comparative Examples, and the adhesive films manufactured through coating and curing were evaluated as to the properties shown in Table 2.

thickness of 1,000 μm and cut into a specimen having a size of 2 cm×10 cm×1,000 μm (width×length×thickness). With both ends of the specimen secured to a spectroscopic ellipsometer (model: M-220, Japan Spectroscopic Co., Ltd.),

TABLE 2

| Evaluation Item | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Storage modulus G1 (23° C., MPa) | | 0.51 | 0.50 | 0.48 | 0.55 | 0.51 | 0.48 | 0.51 | 0.51 | 0.40 | 0.09 | 0.08 |
| Storage modulus G2 (85° C., MPa) | | 0.19 | 0.12 | 0.09 | 0.26 | 0.19 | 0.17 | 0.20 | 0.26 | 0.05 | 0.04 | 0.01 |
| Change in storage modulus (ΔG', MPa) | | 0.32 | 0.38 | 0.39 | 0.29 | 0.32 | 0.31 | 0.31 | 0.25 | 0.35 | 0.05 | 0.07 |
| Change in retardation (ΔRo, nm) | | 1.3 | 0.6 | 0.5 | 1.2 | 1.3 | 0.1 | −0.1 | 0.1 | 1.5 | 1.7 | 0.2 |
| K | | 0.42 | 0.23 | 0.20 | 0.35 | 0.42 | 0.03 | −0.03 | 0.03 | 0.53 | 0.09 | 0.01 |
| Light leakage | In central portion of panel | ○ | ○ | ○ | ○ | ○ | Δ | X | Δ | X | X | X |
| | At end of panel | ○ | ○ | ○ | ○ | ○ | Δ | X | Δ | X | X | ○ |

(1) Change in Storage Modulus (ΔG', Unit: MPa)

Each of the adhesive compositions for polarizing plates prepared in Examples 1 to 5 and Comparative Examples 1 to 6 was coated onto a release film (for example, a polyethylene terephthalate film), followed by drying at 100° C.

retardation ($R_0$) in a central portion of the specimen was measured at a wavelength of 590 nm under a load of 125 mN/15 mm while elevating the interior of the spectroscopic ellipsometer from 0° C. to 100° C. at a rate of 10° C./min. Retardation at 85° C. ($R_{01}$) and retardation at 23° C. ($R_{02}$)

were measured and the change in retardation ($\Delta R_0$) was calculated by Equation 3.

$$\Delta R_0 = R_{01} - R_{02} \quad \text{Equation 3}$$

(3) K Value

From the change in storage modulus ($\Delta G'$) and the change in retardation ($\Delta R_0$), a K value was calculated by Equation 1.

$$K \text{ value} = \Delta G' \times \Delta R_0 \quad \text{Equation 1}$$

(4) Light Leakage

Each of the polarizing plates subjected to aging in Examples 1 to 5 and Comparative Examples 1 to 6 was cut into a piece having a size of 1,200 mm×900 mm (length× width), which in turn was stacked on a glass substrate. Next, a pressure of 4 kg/cm² to 5 kg/cm² was applied to the polarizing plate piece, thereby preparing a polarizing plate specimen. The prepared specimens (1,200 mm×900 mm) were attached to both surfaces of a 7 inch TN-mode LCD panel such that the optical axes thereof were crossed. Next, the LCD panel was left at 85° C. for 500 hours and unloaded at room temperature. Next, the LCD panel was observed in a dark room using a backlight to determine whether light leakage occurred on the LCD panel. The occurrence of light leakage was observed in a central portion of the LCD panel and at an end portion of the LCD panel.

○: Difficult to determine light leakage with the naked eye
Δ: Slight light leakage
X: Severe light leakage (5) Reliability A polarizing plate, onto which each of the adhesive films for polarizing plates prepared in Examples 1 to 5 and Comparative Examples 1 to 6 was coated, was cut to a piece having a size of 100 mm×175 mm (width×length), which in turn was stacked on a glass substrate. Next, a pressure of 4 kg/cm² to 5 kg/cm² was applied to the polarizing plate piece, thereby preparing a specimen. The specimen was left at 60° C./85% RH for 500 hours, followed by observing whether the specimen suffered from bubbling or detachment.

○: No occurrence of bubbling or detachment
Δ: Slight occurrence of bubbling or detachment
X: Severe occurrence of bubbling or detachment As shown in Table 2, the adhesive films for polarizing plates according to embodiments of the present invention had K values in a specific range, thereby suppressing light leakage in the central portion of the panel and even at the end portion of the panel. Thus, the adhesive films for polarizing plates according to present invention can suppress light leakage due to changes in a polarizing plate at high temperature and/or high humidity through stress suppression and optical compensation.

On the other hand, it can be seen that, since the adhesive films of Comparative Examples 1 to 6 having K values outside the range according to embodiments of the present invention did not sufficiently cancel out birefringence or did not suppress stress, as compared with the adhesive films of Examples 1 to 5. As such, the adhesive films of Comparative Examples 1 to 6 exhibited significant light leakage.

While certain exemplary embodiments have been illustrated and described, it should be understood that various modifications, changes, alterations, and equivalent embodiments may be made by those skilled in the art without departing from the spirit and scope of the invention, as defined in the following claims.

What is claimed is:

1. An acrylic adhesive film for polarizing plates, the acrylic adhesive film having a K value of about 0.2 to about 0.5, as calculated by Equation 1:

$$K = \Delta G' \times \Delta R_0 \quad \text{Equation 1}$$

wherein $\Delta G'$ is defined by Equation 2, and $\Delta R_0$ is defined by Equation 3;

$$\Delta G' = G1 - G2 \quad \text{Equation 2}$$

wherein G1 is a storage modulus in MPa at 23° C. and G2 is a storage modulus in MPa at 85° C., as measured from a 500 μm thick stacked adhesive film for polarizing plates by temperature sweep testing under a strain of 5%, a normal force of 100 N and an angular frequency of 1 rad/sec while elevating temperature from 0° C. to 100° C. at a rate of 10° C./min using an advanced rheometry expansion system;

$$\Delta R_0 = R_{01} - R_{02} \quad \text{Equation 3}$$

wherein $R_{01}$ is retardation in nm at 85° C. at a wavelength of 590 nm, and $R_{02}$ is retardation in nm at 23° C. at a wavelength of 590 nm, as measured from a 1 mm thick adhesive film for polarizing plates upon application of a stress of 125 mN/15 mm while elevating temperature from 0° C. to 100° C. at a rate of 10° C./min.

2. The adhesive film for polarizing plates according to claim 1, wherein the G1 of the adhesive film is about 0.45 MPa to about 1 MPa.

3. The adhesive film for polarizing plates according to claim 1, wherein the G2 of the adhesive film is about 0.01 MPa to about 0.3 MPa.

4. The adhesive film for polarizing plates according to claim 1, wherein the adhesive film is formed of an adhesive composition for polarizing plates comprising (A) a crosslinkable (meth)acrylic copolymer containing a crosslinkable functional group, (B) a non-crosslinkable (meth)acrylic copolymer having positive birefringence, and (C) a curing agent.

5. The adhesive film for polarizing plates according to claim 4, wherein the (A) crosslinkable (meth)acrylic copolymer is a copolymer of a monomer mixture comprising a crosslinkable functional group-containing monomer, and the crosslinkable functional group-containing monomer is present in an amount of about 1 wt % to about 20 wt % in the monomer mixture.

6. The adhesive film for polarizing plates according to claim 4, wherein the (B) non-crosslinkable (meth)acrylic copolymer is a copolymer of a monomer mixture comprising a crosslinkable functional group-containing monomer, and the crosslinkable functional group-containing monomer is present in an amount of less than about 1 wt % in the monomer mixture.

7. The adhesive film for polarizing plates according to claim 4, wherein each of the (A) crosslinkable (meth)acrylic copolymer and the (B) non-crosslinkable (meth)acrylic copolymer has a weight average molecular weight of less than about 1,000,000 g/mol.

8. The adhesive film for polarizing plates according to claim 4, wherein the (B) non-crosslinkable (meth)acrylic copolymer has a weight average molecular weight of about 300,000 g/mol to less than about 1,000,000 g/mol.

9. The adhesive film for polarizing plates according to claim 4, wherein the (A) crosslinkable (meth)acrylic copolymer is a copolymer of a monomer mixture comprising: at least one of a hydroxyl group-containing (meth)acrylic monomer or a carboxylic acid group-containing (meth) acrylic monomer; and an alkyl group-containing (meth) acrylic monomer.

10. The adhesive film for polarizing plates according to claim 4, wherein the (B) non-crosslinkable (meth)acrylic copolymer is a copolymer of a monomer mixture comprising an aromatic group-containing (meth)acrylic monomer, an alkyl group-containing (meth)acrylic monomer, and a (meth)acrylic monomer represented by Formula 2:

Formula 2 wherein A is a $C_1$ to $C_{20}$ aliphatic hydrocarbon group; B is —O— or —S—; $R_1$ is hydrogen or a methyl group; $R_2$ is a $C_1$ to $C_{20}$ aliphatic hydrocarbon group; and n is an integer of 1 to 5.

11. The adhesive film for polarizing plates according to claim 10, wherein the (meth)acrylic monomer represented by Formula 2 comprises 2-(2-ethoxyethoxy)ethyl (meth) acrylate.

12. The adhesive film for polarizing plates according to claim 4, wherein the (A) crosslinkable (meth)acrylic copolymer is present in an amount of about 60 parts by weight to about 95 parts by weight, and the (B) non-crosslinkable (meth)acrylic copolymer is present in an amount of about 5 parts by weight to about 40 parts by weight, each based on 100 parts by weight of the (A) crosslinkable (meth)acrylic copolymer and the (B) non-crosslinkable (meth)acrylic copolymer.

13. The adhesive film for polarizing plates according to claim 4, wherein the adhesive composition for polarizing plates further comprises a silane coupling agent.

14. A polarizing plate comprising the adhesive film for polarizing plates according to claim 1.

15. An optical display comprising the polarizing plate according to claim 14.

* * * * *